United States Patent
Probasco

(10) Patent No.: US 9,485,801 B1
(45) Date of Patent: Nov. 1, 2016

(54) MOBILE COMMUNICATION DEVICE CONNECTED TO HOME DIGITAL NETWORK

(71) Applicant: Sprint Communications Company L.P., Overland Park, KS (US)

(72) Inventor: Scott Probasco, Bedford, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 223 days.

(21) Appl. No.: 14/245,871

(22) Filed: Apr. 4, 2014

(51) Int. Cl.
*H04W 80/04* (2009.01)
*H04L 29/06* (2006.01)

(52) U.S. Cl.
CPC .............. *H04W 80/04* (2013.01); *H04L 67/42* (2013.01)

(58) Field of Classification Search
CPC ............................ H04W 80/04; H04L 67/42
See application file for complete search history.

(56) References Cited

U.S. PATENT DOCUMENTS

| | | | |
|---|---|---|---|
| 7,929,538 B2 | 4/2011 | Gobara et al. | |
| 8,254,305 B1 | 8/2012 | Breau et al. | |
| 8,358,640 B1 | 1/2013 | Breau et al. | |
| 9,118,934 B2 | 8/2015 | Breau et al. | |
| 9,125,234 B1 | 9/2015 | Breau et al. | |
| 2001/0033554 A1 | 10/2001 | Ayyagari et al. | |
| 2005/0058144 A1 | 3/2005 | Ayyagari et al. | |
| 2006/0095472 A1 | 5/2006 | Krikorian et al. | |
| 2006/0193320 A1* | 8/2006 | Shin .................. | H04L 29/12009 370/389 |
| 2006/0245403 A1 | 11/2006 | Kumar | |
| 2007/0143488 A1* | 6/2007 | Pantalone ............... | H04L 63/08 709/230 |
| 2007/0211734 A1 | 9/2007 | Yang et al. | |
| 2008/0126550 A1 | 5/2008 | Yasuma | |
| 2008/0235358 A1 | 9/2008 | Moribe et al. | |
| 2009/0092109 A1* | 4/2009 | Cagenius .......... | H04L 29/12009 370/338 |
| 2009/0100147 A1* | 4/2009 | Igarashi ............. | H04N 7/17309 709/218 |
| 2009/0249067 A1 | 10/2009 | Lie et al. | |
| 2009/0307307 A1 | 12/2009 | Igarashi | |
| 2010/0080238 A1 | 4/2010 | Allan et al. | |
| 2010/0135279 A1* | 6/2010 | Petersson ................. | H04L 67/16 370/352 |
| 2010/0142530 A1 | 6/2010 | Zha et al. | |
| 2010/0191829 A1* | 7/2010 | Cagenius ............ | H04L 12/2834 709/219 |
| 2010/0211665 A1 | 8/2010 | Raza et al. | |
| 2010/0322213 A1 | 12/2010 | Liu et al. | |
| 2011/0107379 A1 | 5/2011 | Lajoie et al. | |
| 2011/0246567 A1* | 10/2011 | Cedervall .......... | H04N 21/4431 709/203 |

(Continued)

OTHER PUBLICATIONS

Notice of Allowance dated Apr. 11, 2012, U.S. Appl. No. 12/689,081, filed Jan. 18, 2012.

(Continued)

*Primary Examiner* — Uzma Alam

(57) ABSTRACT

An electronic device in a home digital living network alliance (DLNA) network. The device comprises a memory, a processor, and a client application stored in the memory, when executed by the processor, communicatively couples to an IP multimedia subsystem (IMS) server, wherein communication between the client application and the IMS server is initiated by the client application, and forwards at least one of content or available service information from the home DLNA network to a mobile communication device via the IMS server. The application further polls the IMS server, and receives at least one of content or available service information from the mobile communication device via the IMS server, whereby issues with firewall, dynamic internet protocol address, and network address translation (NAT) in communicatively coupling the mobile communication device and the home DLNA network are limited.

13 Claims, 7 Drawing Sheets

(56) References Cited

U.S. PATENT DOCUMENTS

| | | | |
|---|---|---|---|
| 2011/0264817 A1* | 10/2011 | Raveendran | H04M 3/5307 709/230 |
| 2011/0270680 A1 | 11/2011 | Lim | |
| 2011/0317678 A1 | 12/2011 | Allan et al. | |
| 2012/0023238 A1* | 1/2012 | Bouthemy | H04L 65/1016 709/227 |
| 2012/0134291 A1 | 5/2012 | Raleigh | |
| 2013/0054829 A1* | 2/2013 | Mathews | H04L 12/2809 709/238 |
| 2014/0075488 A1* | 3/2014 | Christudass | H04L 41/5058 725/114 |
| 2014/0220967 A1* | 8/2014 | Pankajakshan | H04W 48/18 455/432.1 |
| 2015/0207687 A1* | 7/2015 | Richman | H04L 41/0896 370/236 |

OTHER PUBLICATIONS

Pre-Interview Communication dated Jun. 5, 2012, U.S. Appl. No. 12/791,859, filed Jun. 1, 2010.

Notice of Allowance dated Sep. 14, 2012, U.S. Appl. No. 12/791,859, filed Jun. 1, 2010.

Pre-Interview Communication dated Feb. 5, 2015, U.S. Appl. No. 13/711,544, filed Dec. 11, 2012.

Notice of Allowance dated Apr. 29, 2015, U.S. Appl. No. 13/711,544, filed Dec. 11, 2012.

Pre-Interview Communication dated Jan. 30, 2013, U.S. Appl. No. 12/689,121, filed Jan. 18, 2010.

FAIPP Office Action dated Apr. 11, 2013, U.S. Appl. No. 12/689,121, filed Jan. 18, 2010.

Final Office Action dated Jul. 17, 2013, U.S. Appl. No. 12/689,121, filed Jan. 18, 2010.

Advisory Action dated Oct. 4, 2013, U.S. Appl. No. 12/689,121, filed Jan. 18, 2010.

Office Action dated Sep. 22, 2014, U.S. Appl. No. 12/689,121, filed Jan. 18, 2010.

Notice of Allowance dated Apr. 15, 2015, U.S. Appl. No. 12/689,121, filed Jan. 18, 2010.

"Address Resolution Protocol," Wikipedia, http://en.wikipedia.org/w/index.php?title=Address_Resolution_Protocol&printable=yes, (last visited Aug. 25, 2009).

Bahlmann, Bruce, "DLNA Basics, Bridging Services within a Connected Home," Communications Technology, http://www.cable360.net/print/ct/deployment/techtrends/23787.html, Jun. 1, 2007.

Bahlmann, Bruce, "Digital Living Network Alliance (DLNA) Essentials," Birds-Eye.Net, http://www.birds-eye.net/article_archive/digital_living_network_alliance_dlna_essentials.htm, Apr. 1, 2007.

"Network address translation," Wikipedia, http://en.wikipedia.org/w/index.php?title=Network_address_translation&printable=yes, Aug. 20, 2009.

* cited by examiner

MOBILE COMMUNICATION DEVICE CONNECTED TO HOME DIGITAL NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network communication is becoming increasingly prevalent in our daily lives with the rapid development and popularization of network capable devices. Additionally, more and more electronic devices that did not have network capabilities are getting network capable.

SUMMARY

In an embodiment, an electronic device in a home digital living network alliance (DLNA) network is disclosed. The device comprises a memory, a processor, and a client application stored in the memory, when executed by the processor, communicatively couples to an IP multimedia subsystem (IMS) server, wherein communication between the client application and the IMS server is initiated by the client application, and forwards at least one of content or available service information from the home DLNA network to a mobile communication device via the IMS server. The client application further polls the IMS server, and receives at least one of content or available service information from the mobile communication device via the IMS server, whereby issues with firewall, dynamic internet protocol address, and network address translation (NAT) in communicatively coupling the mobile communication device and the home DLNA network are limited.

In an embodiment, a method of communicatively coupling a mobile communication device to a home digital living network alliance (DLNA) network via an IP multimedia subsystem (IMS) is disclosed. The method comprises discovering at least one client application in devices of the home DLNA network, configuring the at least one discovered client application with an IMS server, each client application with a priority state variable, communicatively coupling the IMS server to the client application, and forwarding, by the communicatively coupled client application, at least one of available service information or content from the home DLNA network to the mobile communication device via the IMS server. The method further comprises polling the IMS server, receiving at least one of available service information or content from the mobile communication device via the IMS server, and broadcasting service(s) to the home DLNA network for the mobile communication device, whereby issues with firewall, dynamic internet protocol address, and network address translation (NAT) in communicatively coupling the mobile communication device and the home DLNA network are avoided.

In an embodiment, a method of communicatively coupling a mobile communication device to a home digital network is disclosed. The method comprises communicatively coupling a server to a client application with the highest priority among discovered client applications in the home digital network, forwarding, by the communicatively coupled client application, at least one of available service information or content from the home digital network to a mobile communication device via the server, polling the server, and forwarding at least one of available service information or content from the mobile communication device to the home digital network via the server.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
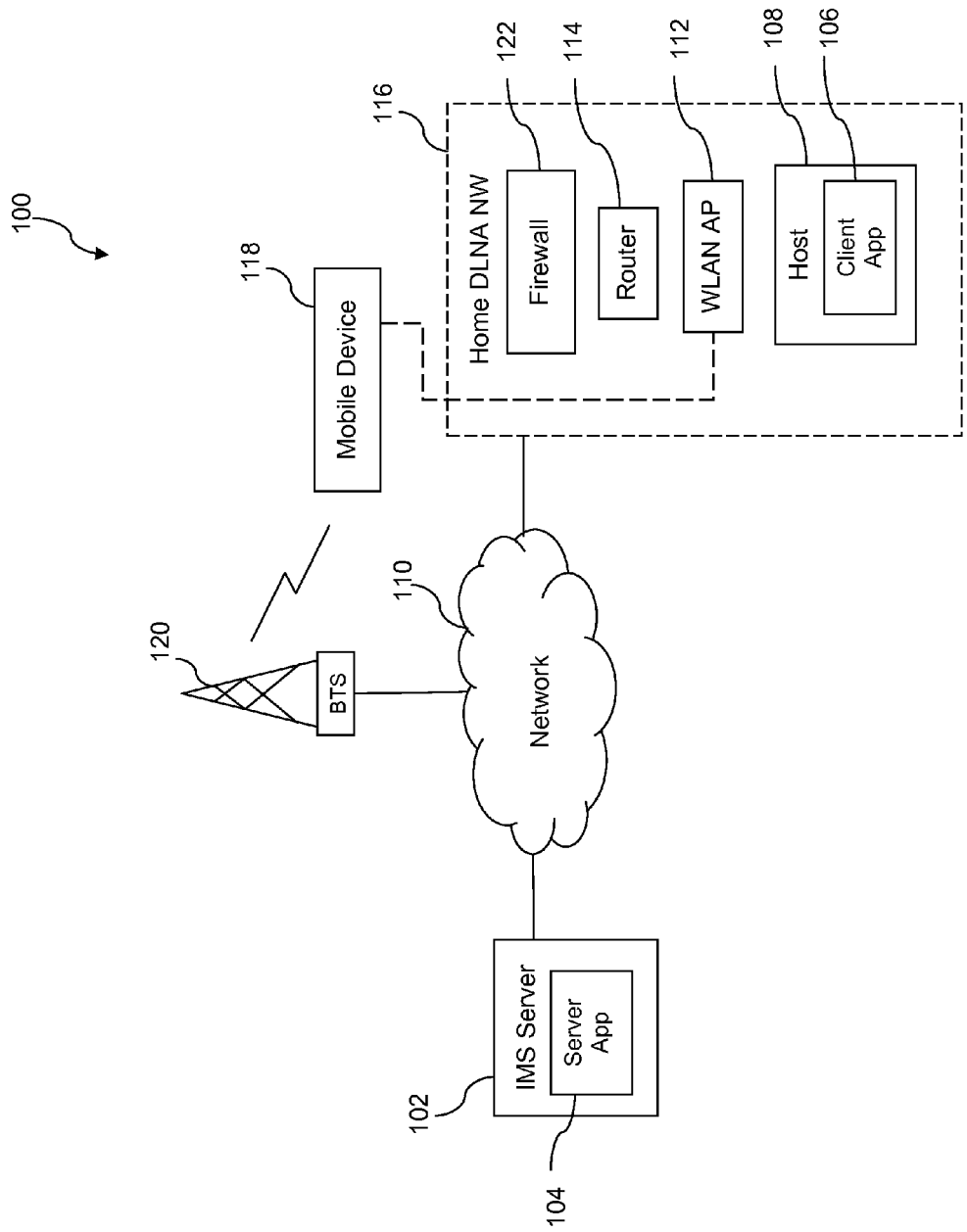
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Electronic devices in a home may be communicatively coupled to a network, for example a home digital living network alliance (DLNA) network, to share content or digital media among the devices. The electronic devices may be any of a media player, a television, a game console, a photo frame, a camera, a network-attached storage (NAS) device, a desktop, a laptop, a mobile phone, or another electronic communication device. The devices in the same home DLNA network may share content or digital media such as videos, audios, pictures, or other types of digital media. One device in the home DLNA network may view and/or download content from another device in the same home DLNA network. One device in the home DLNA network may also transfer content to another device in the same home DLNA network. However, with current home DLNA network systems, when a mobile communication device is physically remote from the home DLNA network, the mobile communication device may not be able to be communicatively coupled to the home DLNA network. This is because the mobile device may be restricted to connecting to the home DLNA network with Bluetooth®, WiFi, or another short-range wireless communication link. For example, when someone with a home DLNA network is far away from the house, the person may not be able to review pictures stored in a photo frame.

The present disclosure teaches a system and method for communicatively coupling a mobile communication device with a home DLNA network using IP multimedia subsystem (IMS) technology. For example, an IMS server may communicate with a mobile communication device through a mobile network or cellular network. A server application on the IMS server may communicate with a client application on a device or host in a home DLNA network via the Internet. The client application may be a client application with the highest priority level among client application(s) discovered in the home DLNA network. The server application and client application may operate similar to network proxies for the mobile device and the home DLNA network.

When the mobile device is physically close to the home DLNA network, for example within 30 meters, 40 meters, or another distance from a wireless local area network (WLAN) access point (AP) or a wireless router of the home DLNA network, the mobile device may be communicatively coupled to the home DLNA network via a short-range wireless communication link, a cellular network comprising the IMS server, or both. When the mobile device is physically remote from the home DLNA network and outside the range of the home DLNA network, the mobile device may be communicatively coupled to the home DLNA network only through a cellular network that comprises the IMS server. The mobile device and device(s) in the home DLNA network may exchange available service information and/or share content through the cellular network and the Internet using the client application and the server application.

When communications start from outside the home DLNA network, the inbound traffic from the Internet to the home DLNA network may be blocked or limited by a firewall of the home DLNA network. Also, incoming traffic initiated from outside the home DLNA network may have difficulty reaching a destination inside the home DLNA network due to dynamic internet protocol address assignment or network address translation that are implemented by a router of the home DLNA network. For example, the router that connects the home DLNA network to a network may assign dynamic internet protocol addresses to host(s) in the home DLNA network, for example using dynamic host configuration protocol (DHCP). A device from outside the home DLNA network that desires to initiate a communication session with host(s) inside the home DLNA network may not know the internet address(es) of the host(s) inside the home DLNA network and may not be able to start the communication.

Also, the router may conduct network address translation (NAT) for host(s) in the home DLNA network, which may prevent incoming traffic from initiating communication with host(s) in the home DLNA network. The network address translation may translate private internet address(es) of the host(s) in the home DLNA network to a public internet address, for example the public internet address of the router, when outbound traffic is traveling from the inside of the home DLNA network to outside the network. The network address translation may also translate the public internet address to the corresponding private internet address(s) when reply traffic comes from the network to the home DLNA network. The network address translation may make it difficult for hosts(s) in the home DLNA network to accept incoming communications from the network. By initiating communication with devices outside the home DLNA network from inside the home DLNA network, the issues with the firewall blocking incoming traffic, dynamic internet protocol address assignment, and the network address translation may be avoided.

In an embodiment, the client application executing on the host in the home DLNA network periodically establishes a communication session with the server application executing on IMS server to announce services and content that the home DLNA network can support and to request information about services and content that the mobile device may support and/or provide to the home DLNA network. The IMS server may reply to the client application via the communication session, thereby avoiding the issue with communicating through the firewall of the home network.

Turning now to FIG. 1, a communication system 100 is described. In an embodiment, the communication system 100 comprises a plurality of mobile devices 118, a plurality of home digital living network alliance (DLNA) networks (NWs) 116, and an IP multimedia subsystem (IMS) server 102. The IMS server 102 may comprise a server application 104. The home DLNA network 116 may comprise a firewall 122, a router 114, a wireless local area network (WLAN) access point (AP) 112, a plurality of hosts 108, and at least one client application 106. The mobile device 118 is configured to use a radio transceiver to establish a wireless communication link with a base transceiver station (BTS) 120, and the base transceiver station 120 provides communications connectivity of the mobile device 118 to a network 110. The IMS server 102 and the Home DLNA network 116 may also have access to the network 110. The network 110 may comprise any combination of private and public networks.

It is understood that the system 100 may comprise any number of mobile devices 118, any number of base transceiver stations 120, any number of IMS servers 102, and any number of home DLNA networks 116. The collectivity of base transceiver stations 120 may be said to comprise a radio access network, in that these base transceiver stations 120 may provide a radio communication link to the mobile devices 118 to provide access to the network 110. The radio access network may be abstracted in different ways and may comprise, in addition to the base transceiver stations 120, components from the wireless access network.

The radio transceiver of the mobile device 118 may communicate with the base transceiver station 120 using any of a variety of wireless communication protocols including a code division multiple access (CDMA) wireless communication protocol, a global system for mobile communication (GSM) wireless communication protocol, a long-term evolution (LTE) wireless communication protocol, a worldwide interoperability for microwave access (WiMAX) wireless communication protocol, or another wireless communication protocol. The mobile device 118 may be any of a mobile phone, a personal digital assistant (PDA), a media player, a laptop computer, a tablet computer, a notebook computer, or another network/communications capable device. In an embodiment, the mobile device 118 may have other components (not shown) such as a near field communication (NFC) radio transceiver, a short range radio transceiver such as a wireless local area network (WLAN) radio transceiver, or other components.

In long-term evolution (LTE) networks, the base transceiver station 120 may be an E-UTRAN node B (eNodeB). The mobile device 118 may communicate with the IMS server 102 via the E-UTRAN node B, a serving gateway (S GW), and a packet data network gateway (P GW). The serving gateway may be communicatively coupled to the E-UTRAN node B and the packet data network gateway while the packet data network gateway may be further communicatively coupled to the IMS server 102.

The firewall 122 may be a piece of hardware or software that monitors and/or controls the transmission of inbound network traffic that attempts to pass through the perimeter of a network (or a host), for example a local area network. In an embodiment, the firewall 122 may monitor and/or control the transmission of network traffic that attempts to pass from the network 110 into the home DLNA network 116. The firewall 122 may be a standalone firewall or may be located in the router 114. The firewall 122 may block incoming traffic of a communication session that was initiated from outside the home DLNA network 116. On the other hand, if a communication session is initiated from inside the home DLNA network 116, the firewall 122 may not block or limit reply traffic from outside the home DLNA network 116.

The router 114 that connects the home DLNA network 116 to the network 110 may assign dynamic internet protocol addresses to host(s) in the home DLNA network 116, for example using dynamic host configuration protocol (DHCP). A device from outside the home DLNA network 116 that desires to initiate a communication session with host(s) inside the home DLNA network 116 may not know the internet address(es) of the host(s) inside the home DLNA network 116 and may not be able to start the communication. Also, the router 114 may conduct network address translation (NAT) for host(s) in the home DLNA network 116, which may prevent incoming traffic from initiating communication with host(s) in the home DLNA network 116. The network address translation may translate private internet address(es) of the host(s) in the home DLNA network 116 to a public internet address, for example the public internet address of the router 114, when outbound traffic is traveling from the inside of the home DLNA network 116 to outside the network 110. The network address translation may also translate the public internet address to the corresponding private internet address(s) when reply traffic comes from the network 110 to the home DLNA network 116. The network address translation may make it difficult for hosts(s) in the home DLNA network 116 to accept incoming communications from the network 110. By initiating communication with devices outside the home DLNA network 116 from inside the home DLNA network 116, the issues with the firewall blocking incoming traffic, dynamic internet protocol address assignment, and the network address translation may be avoided.

The wireless local area network access point 112 may be a device that allows wireless devices, for example wireless host(s) 108 of the home DLNA network 116, to connect to a wired network. For example, the home DLNA network 116 may be communicatively coupled to the network 110 by the router 114 through a wired communication link. Host(s) 108 of the home DLNA network 116 may be communicatively coupled to the network 110 through the wireless local area network access point 112 and/or the router 114. For example, wired host(s) 108 may be communicatively coupled to the network 110 through a wired communication link by the router 114. Wireless host(s) 108 may be communicatively coupled to the wireless local area network access point 112 through a wireless communication link. The wireless host(s) 108 may be first communicatively coupled to the wireless local area network access point 112, for example via Bluetooth®, WiFi, or another type of wireless network protocol. The wireless local area network access point 112 may allow the wireless host(s) 108 to communicate with the wired network that the router 114 is communicatively coupled to. The wireless local area network access point 112 may be communicatively coupled to the router 114. Alternatively, the wireless local area network access point 112 may be an integral component of the router 114 when the router 114 is a wireless router. The firewall 122, the router 114, and the wireless local area network access point 112 may be combined in the same device. For example, the firewall 122, the router 114, and the wireless local area network access point 112 may be combined in a wireless router such as may be purchased from consumer electronic retail stores.

In an embodiment, the server application 104 may be stored in a memory in the IMS server 102. When executed by a processor of the IMS server 102, the server application 104 may communicate with the client application 106 on the host 108 through the network 110. The network 110 may be a public network, for example the Internet. For example, the IMS server 102 may be communicatively coupled to the host 108 through the server application 104 and the client application 106. Additionally, the IMS server 102 may be communicatively coupled to the mobile device 118 through the base transceiver station 120. For example, the mobile device 118 may communicate with the IMS server 102 through a cellular network, for example a long-term evolution communication link, a third generation communication link, or another type of cellular network. The IMS server 102 may communicate with the client application 106 on the host 108 through the network 110. Thus, the mobile device 118 may communicate with the home DLNA network 116, for example with a host 108 via the server application 104, the network 110, and the client application 106 on the host 108.

The server application 104 may transmit content or available service information from the mobile device 118 to the host 108 via the network 110. The server application 104 may also transmit content or available service information from host(s) 108 in the home DLNA network 116 to the mobile device 118. For example, data from the mobile device 118 may be forwarded by the server application 104 to the client application 106 via the network 110. The data may be content or available service information from the mobile device 118. The available service information of the mobile device 118 may be information about services available to the home DLNA network 116 from the mobile device 118, for example video sharing, audio sharing, picture sharing, or another type of service. The content may comprise audios, videos, pictures, or other type of content that the mobile device 118 may share with the home DLNA network 116.

When host(s) 108 desires to transmit content or available service information to the mobile device 118, the client application 106 may first transmit the content or the available service information to the server application 104 via the network 110. The available service information of the host(s) 108 in the home DLNA network 116 may be information about available services from the host(s) 108 in the home DLNA network 116, for example video sharing, audio sharing, picture sharing, or another type of service. The content may comprise audios, videos, pictures, or other type of content that the host(s) 108 in the home DLNA network 116 may share with the mobile device 118. The server application 104 may forward the content or the available service information from the host(s) 108 to the mobile device 118.

The client application 106 may be stored in a memory of the host 108. When executed by a processor of the host 108, the client application 106 may be communicatively coupled to the server application 104 through the network 110. Alternatively, the client application may be stored in the wireless local area network access point 112 and may be executed by a processor of the wireless local area network access point 112. The client application 106 may operate as a proxy for the home DLNA network 116 to communicate with the mobile device 118. The client application 106 may periodically poll the IMS server 102 for updates on content and/or available service information from the mobile device 118. Additionally, the client application 106 may periodically examine whether or not the mobile device 118 is communicatively coupled to the IMS server 102.

During initial configuration for home DLNA network 116 access, the mobile device 118 may be communicatively coupled to the home DLNA network 116 via short-range wireless communication link to the access point 112, for example via Bluetooth®, wireless local area network link, or another type of short-range wireless communication link. The mobile device 118 may also be communicatively coupled to a mobile data network, for example through a base transceiver station 120 and/or an IMS server 102 of a long-term evolution network. The mobile device 118 may recognize a routable IMS server 102 and may provide a static IMS gateway internet protocol address to the home DLNA network 116. The routable IMS server 102 may comprise a server application 104 that may communicate with the client application 106. The mobile device 118 may also provide information of the routable IMS server 102 to the home DLNA network 116.

The mobile device 118 may discover the client application 106 from the host(s) 108 of the home DLNA network 116. The mobile device 118 may configure the client application 106 with the internet protocol address of the IMS server 102. The client application 106 may operate as a proxy for the home DLNA network 116 to communicate with the mobile device 118.

When the mobile device 118 is outside the range of the home DLNA network 116, the mobile device 118 may only be communicatively coupled to a cellular network. In this case, the mobile device 118 may communicate with the home DLNA network 116 through the server application 104 and/or the client application 106. For example, content and/or available service information from the mobile device 118 may be forwarded by the server application 104. The content and/or the available service information may be transmitted to the client application 106 via the network 110 by the server application 104. Content and/or available service information of the host(s) 108 in the home DLNA network 116 may be forwarded by the client application 106 to the server application 104. The server application 104 may transmit the content and/or the available service information of the host(s) 108 to the mobile device 118.

For example, the client application 106 may periodically poll the IMS server 102, for example every two minutes, every one minute, every 30 seconds, or at some other periodic interval. By periodically polling the IMS server 102, communication between the home DLNA network 116 and the mobile device 118 may be initiated by the client application 106, thus from inside the home DLNA network 116. When communication is initiated from inside the home DLNA network 116, issues with dynamically assigned internet protocol address, firewall blocking traffic from incoming traffic outside the home DLNA network 116, and/or network address translation (NAT) may be limited.

The client application 106 may examine the server application 104 for updates on content or available service information from the mobile device 118, for example by sending a request for updates on the content or the available service information. The server application 104 may then examine the mobile device 118 for updates on the content or the available service information since last communication from the mobile device 118 to the home DLNA network 116.

When updated content or available service information is available at the mobile device 118 to be sent to the home DLNA network 116, the client application 106 may request the server application 104 for the update(s). Upon the receipt of the request from the client application 106, the server application 104 may then request the mobile device 118 for the update(s). The mobile device 118 may transmit the update(s) on the content and/or the available service information to the home DLNA network 116 via the server application 104. When the requested update(s) contains content and is received at the client application 106, the client application 106 may forward the content to the destination host(s) 108 in the home DLNA network 116. Alternatively, when the received update(s) is update(s) on available service at the mobile device 118, the client application 106 may broadcast the update(s) on the available service information to the home DLNA network 116. For example, every host 108 in the home DLNA network 116 may receive the update(s) on the available service information at the mobile device 118.

Additionally, the client application 106 may transmit updated content and/or available service information from host(s) 108 to the mobile device 118 via the server application 104. When update(s) on the content and/or the available service information from host(s) 108 in the home DLNA network 116 is ready to be sent to the mobile device 118, the client application 106 may transmit the update(s) to the mobile device 118 via the server application 104. For example, when an update(s) from the host 108 with the client application 106 is available to be sent to the mobile device 118, the client application 106 may transmit the update(s) to the server application 104 through the network 110. When an update(s) is available on host(s) other than the host 108 with the client application 106, the host(s) with the update(s) may transmit the update(s) to the client application 106. The client application 106 may forward the update(s) to the server application 104 through the network 110. Upon the receipt of the update(s) from the host(s) in the home DLNA network 116, the server application 104 may transmit the update(s) to the mobile device 118. One client application 106 may support more than one mobile device 118. Also, one client application 106 may support more than one host in the home DLNA network 116.

The client application 106 may periodically examine whether or not the mobile device 118 is communicatively coupled to the IMS server 102, for example every two minutes, every one minute, every 20 seconds, or at some other periodic interval. When the mobile device 118 is detected to be not communicatively coupled to the IMS server 102, for example when the mobile device 118 is communicatively coupled to another IMS server 102, the client application 106 may pause, stop, and/or halt communicating with the IMS server 102. Alternatively, the client application 106 may communicate with the mobile device 118 to gain the information of the new IMS server the mobile device 118 is now communicatively coupled with. The client application 106 may start communicating with the new IMS server.

The host 108 may be a piece of customized hardware, for example a device with a customized operating system, which supports the client application 106. Alternatively, the host 108 may be a device with an Android operating system, a Windows operating system, an Apple MAC OS operating system, or another operating system, with the client application 106.

In another embodiment, more than one client application may be discovered in the home DLNA network 116 by the mobile device 118. For redundancy, the mobile device 118 may configure all the discovered client applications, for example with information of the IMS server 102 such as the internet protocol address of the IMS server 102. Each client application 106 may be associated with an individual priority state variable. The priority state variables may be different for each client application. The priority state variable may be determined by redefined rules or by a user of the mobile device 118. Each host 108 with a client application 106 and/or the mobile device 118 may record the client application information from other hosts in the home DLNA network 116, for example the priority state variable and an internet protocol address of the corresponding host 108. The internet protocol address may be a private internet protocol address. The client application 106 that holds the highest priority among client application(s) 106 in the home DLNA network 116 may be communicatively coupled to the IMS server 102. The client application 106 with the highest priority among the client application(s) 106 in the home DLNA network 116 may operate as a proxy for the home DLNA network 116 to communicate with the mobile device 118.

The client application 106 may periodically examine priority state variable(s) of client application(s) 106 from the host(s) 108 in the home DLNA network 116. The client application 106 may periodically examine whether or not the client application 106 holds the highest priority among client applications in the home DLNA network 116, for example every five minutes, every two minutes, every one minute, or at some other periodic interval. The client application 106 may periodically examine whether or not the mobile device 118 is communicatively coupled to the IMS server 102, for example every two minutes, every one minute, every 20 seconds, or at some other periodic interval. The frequency for the client application 106 to examine the priority of the client application 106 and to examine the connectivity of the mobile device 118 to the IMS server 102 may be uncorrelated.

When the client application 106 still holds the highest priority among client applications in the home DLNA network 116 and the mobile device 118 is communicatively coupled to the IMS server 102, the client application 106 may continue operating as a proxy between the mobile device 118 and the home DLNA network 116. When the client application 106 finds another client application that holds the highest priority level among client applications in the home DLNA network 116, the client application with the latest highest priority level may begin operating as the proxy between the mobile device 118 and the home DLNA network 116. When the mobile device 118 is detected to be not communicatively coupled to the IMS server 102, for example when the mobile device 118 is communicatively coupled to another IMS server 102, the client application 106 may pause, stop, and/or halt communicating with the IMS server 102. Alternatively, the client application 106 may communicate with the mobile device 118 to gain the information of the new IMS server the mobile device 118 is now communicatively coupled with. The client application 106 may start communicating with the new IMS server.

Figure 2:
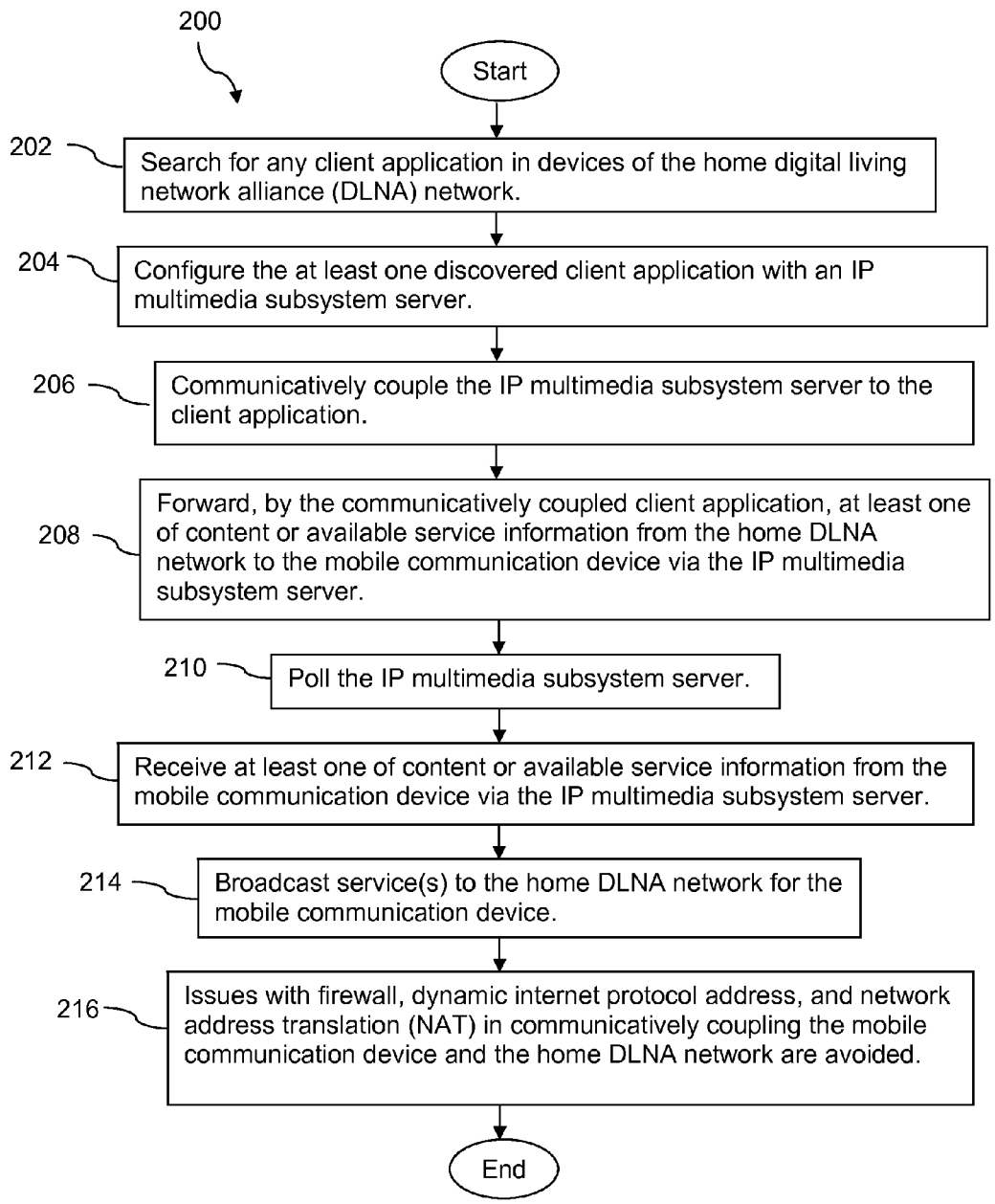
FIG. 2 is a flow chart illustrating a method according to an embodiment of the disclosure.

Turning now to FIG. 2, a method 200 is described. At block 202, at least one client application is discovered in devices of the home digital living network alliance (DLNA) network. For example, during its initial configuration with the home DLNA network 116, the mobile device 118 may be communicatively coupled to the home DLNA network 116 through Bluetooth®, WiFi, wireless local area network, or another type of short-range wireless communication technology. The mobile device 118 may discover at least one client application in host(s) of the home DLNA network 116. For example, the host with the client application may be configured to broadcast the client application to other host(s) in the home DLNA network 116. The mobile device 118 may also receive the information.

At block 204, the at least one discovered client application is configured with an IMS server 102. The mobile device 118 may provide its static IMS gateway internet protocol address to the home DLNA network 116 during its initial configuration with the home DLNA network 116, for example by broadcasting the static IMS gateway internet protocol address to hosts in the home DLNA network 116. The mobile device 118 may broadcast information on a routable IMS server 102 to the home DLNA network 116, for example the internet protocol address of the IMS server 102. The client application 106 in the home DLNA network 116 may record the static IMS gateway internet protocol address of the mobile device 118 and the information of the IMS server 102. When the IMS server 102 is no longer communicatively coupled to the mobile device 118, the client application 106 may find the mobile device 118 with the static IMS gateway internet protocol address. The mobile device 118 may configure the discovered client application 106 with the internet protocol address of the IMS server 102. For example, the mobile device 118 may send the internet protocol address of the IMS server 102 to the client application 106.

At block 206, the IMS server 102 is communicatively coupled to the client application. For example, after receiving the information about the discovered client application 106, the IMS server 102 may then communicatively couple to the client application 106.

At block 208, at least one of available service information or content from the home DLNA network is forwarded by the communicatively coupled client application 106 to the mobile device 118 via the IMS server 102. For example, when available service information and/or content from host(s) of the home DLNA network 116 is available to be transmitted to the mobile device 118, the client application 106 that is communicatively coupled to the IMS server 102 may transmit the available service information and/or content to the mobile device 118 via the IMS server 102, for example via the server application 104. The available service information from host(s) in the home DLNA network 116 may be broadcasted by host(s) and the client application 106 may transmit the available service information to the IMS server 102. Upon receipt of the available service information from the home DLNA network 116, the server application 104 may transmit the information to the mobile device 118.

When a host in the home DLNA network 116 desires to transmit content to the mobile device 118, for example after receiving a request from the mobile device 118 for the content, the client application 106 may forward the content from the host to the mobile device 118 via the IMS server 102. The client application 106 may operate similar to a network proxy between the mobile device and the home DLNA network 116.

At block 210, the IMS server is polled. For example, the client application 106 may periodically poll the IMS server 102. In order to avoid issues with dynamically assigned internet protocol address, firewall blocking traffic from incoming traffic outside the home DLNA network 116, and/or network address translation (NAT), the client application 106 may initiate communication session(s) between the mobile device 118 and the home DLNA network 116. By periodically polling the IMS server 102, the client application 106 may examine parameter(s) on the IMS server 102 and determine whether or not a communication session is desirable. For example, when the mobile device 118 holds updated available service information and/or content to be transmitted to the home DLNA network 116, the client application 106 may start a new communication session between the mobile device 118 and the home DLNA network 116.

At block 212, at least one of available service information or content from the mobile communication device is received via the IMS server. For example, during the communication session between the mobile device 118 and corresponding host(s) in the home DLNA network 116, available service information and/or content from the mobile device 118 may be received by the corresponding host(s) in the home DLNA network 116 via the IMS server 102.

At block 214, service(s) is broadcasted to the home DLNA network for the mobile device 118. For example, when available service information from the mobile device 118 is received by the client application 106, available service(s) from the mobile device 118 may be broadcasted to the host(s) in the home DLNA network 116 by the client application 106. At block 216, issues with firewall, dynamic internet protocol address, and network address translation (NAT) in communicatively coupling the mobile communication device and the home DLNA network are avoided.

Figure 3:
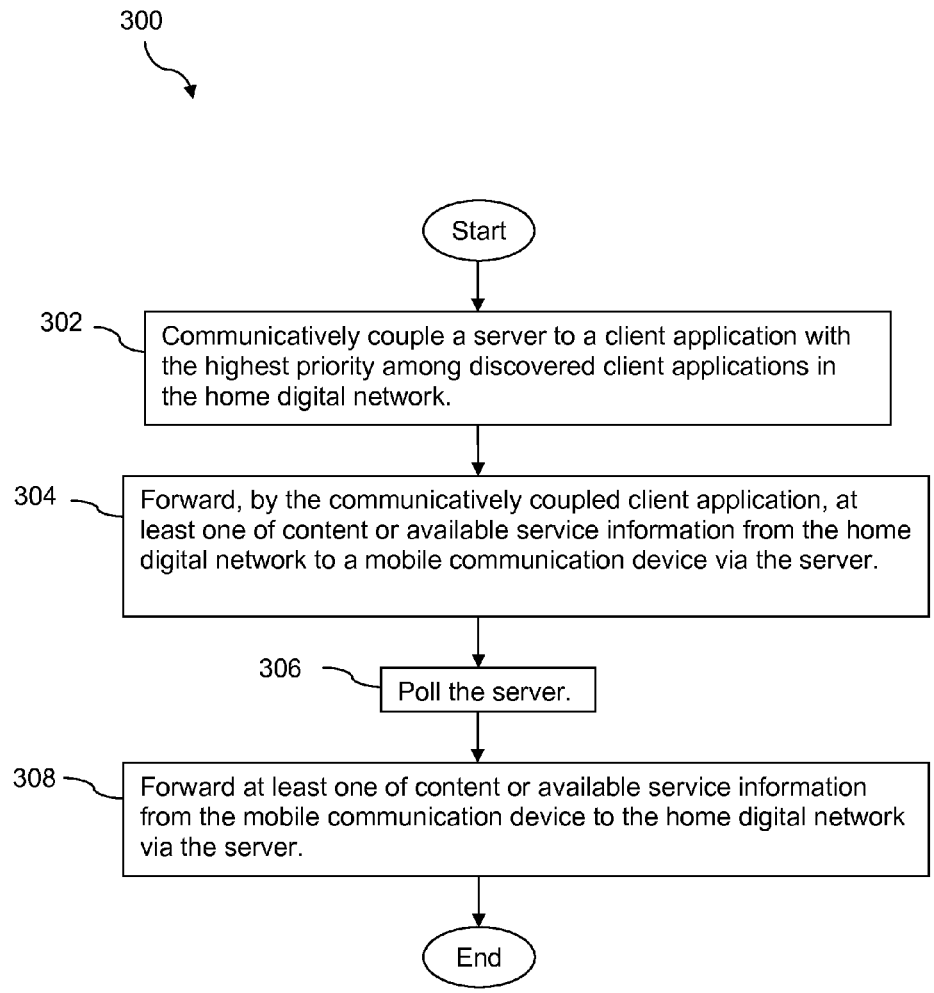
FIG. 3 is a flow chart illustrating another method according to an embodiment of the disclosure.

Turning now to FIG. 3, a method 300 is described. At block 302, an IMS server 102 is communicatively coupled to a client application 106 with the highest priority among discovered client applications in the home digital network 116. At block 304, at least one of available service information or content from the home digital network 116 is forwarded by the communicatively coupled client application 106 to a mobile device 118 via the IMS server 102. At block 306, the IMS server 102 is polled. At block 308, at least one of available service information or content from the mobile device 118 is forwarded to the home digital network 116 via the server 102.

Figure 4:
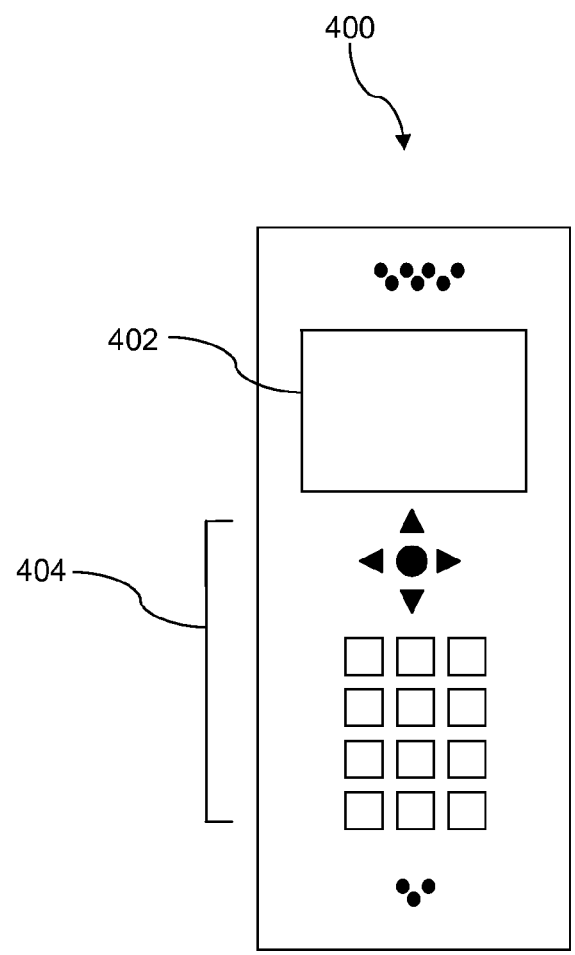
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
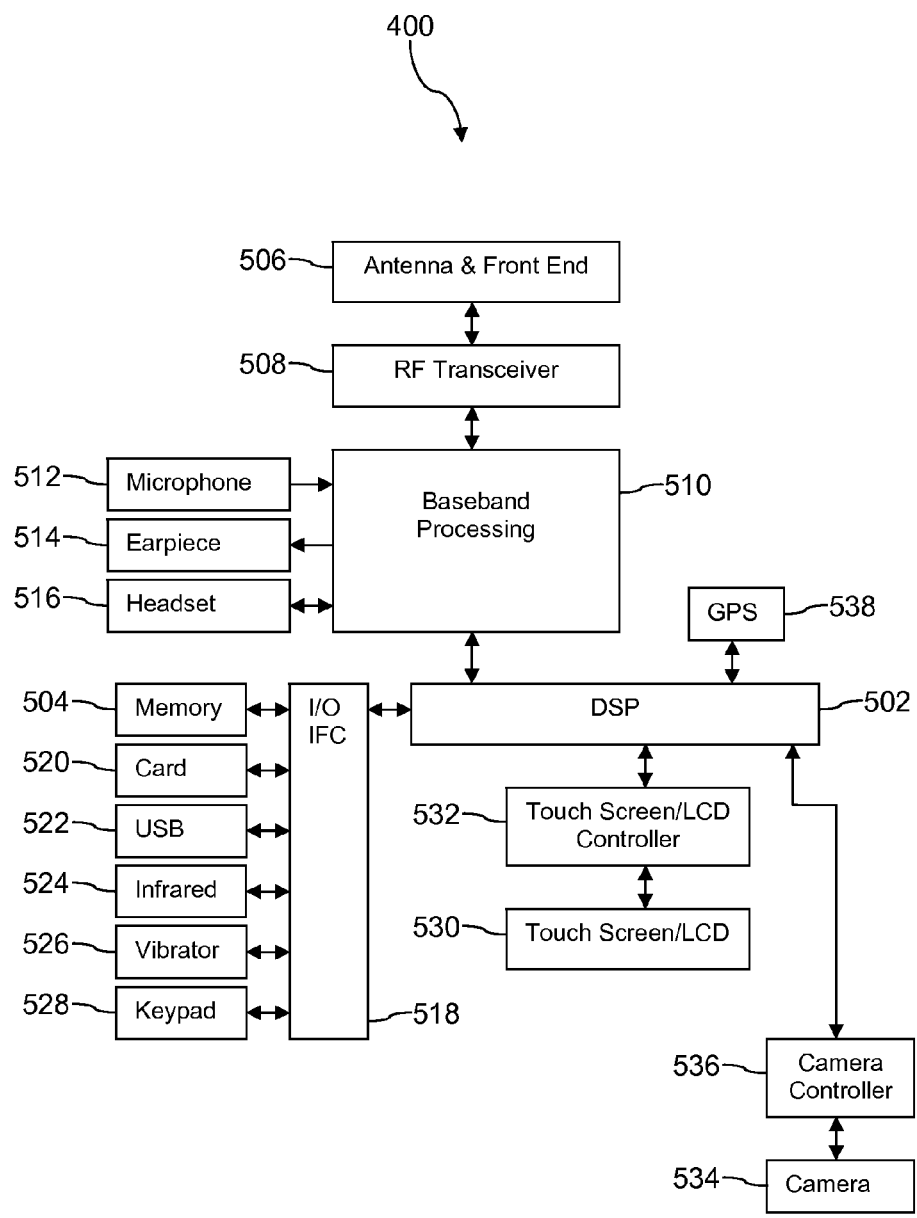
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
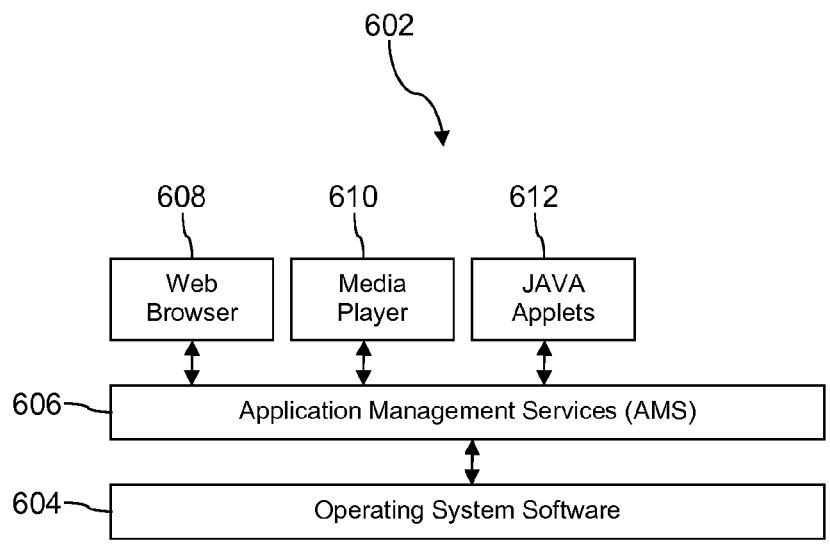
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
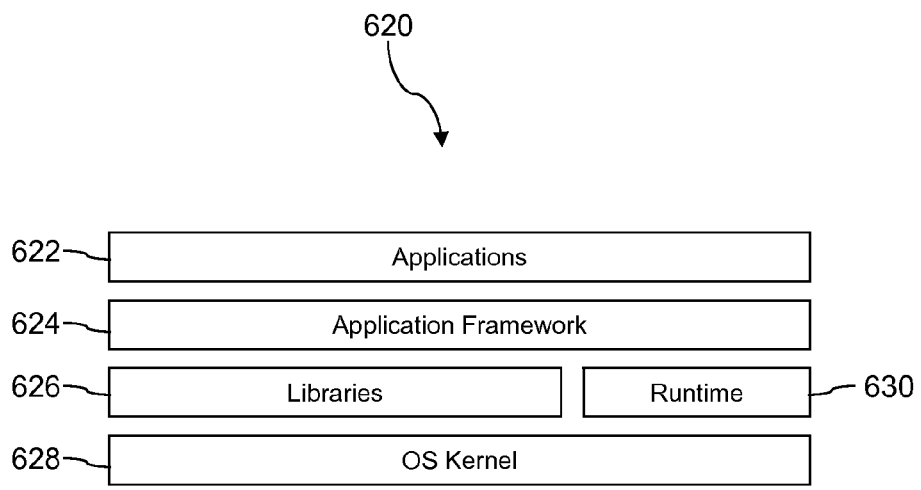
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
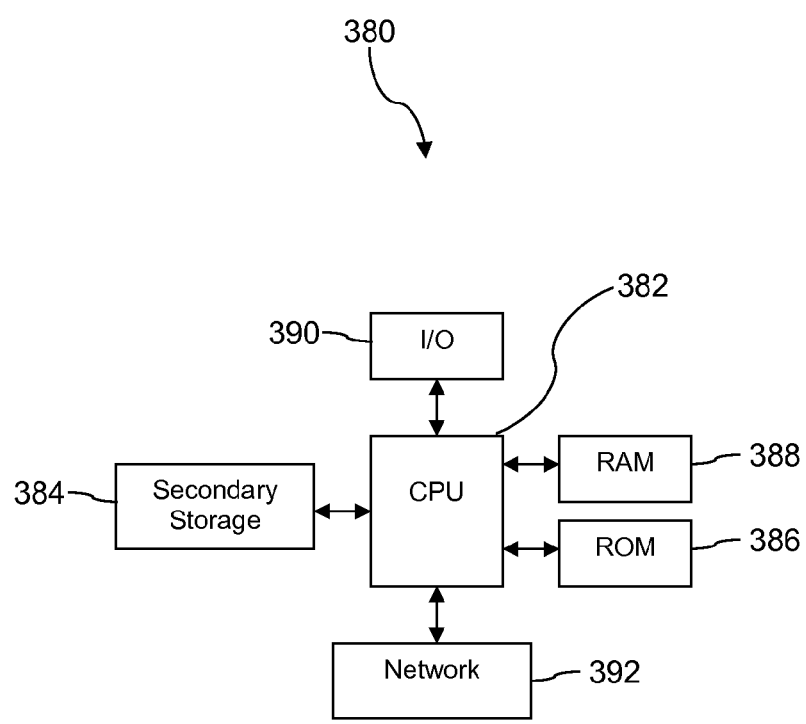
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for communicatively coupling a mobile communication device with a home digital living network alliance (DLNA) network using IP multimedia subsystem (IMS) technology, comprising:
 a home DLNA network comprising:
  a firewall that limits inbound traffic to a plurality of host devices in the home DLNA network from devices outside the home DLNA network;
  a router that implements dynamic internet protocol address assignment and network address translation for the plurality of host devices in the home DLNA network, which hinders devices outside the home DLNA network from being able to initiate a communication session with the plurality of host devices inside the home DLNA network; and the plurality of host devices executing one or more client applications;

an IMS server remote from the home DLNA network; and a mobile communication device that during initial configuration with the home DLNA network;

discovers a client application of the one more applications executing on a host device of the plurality of hosts, and configures the client application with an internet protocol routable address of the IMS server recognizable by the router, wherein when the mobile communication device is physically remote from home DLNA network after the configuration of the client application, the client application executing on the host device of the home DLNA network:

communicatively couples to the IMS server, forwards, from the home DLNA network to the IMS server, at least one of content or available service information destined for the mobile communication device, periodically polls the IMS server for at least one of content or available service information destined for the home DLNA network from the mobile communication device, responsive to the periodic polling, initiates, from within the home DLNA network, a communication session between the home DLNA network and the mobile communication device through the IMS server, and receives, from the IMS server, the at least one of content or available service information destined for the home DLNA network from the mobile communication device.

2. The system of claim 1, wherein the mobile communication device determines the internet protocol routable address of the IMS server.

3. The system of claim 2, wherein the IMS server runs a server application to communicate with the client application.

4. The system of claim 1, wherein during the initial configuration for access to the home DLNA network, the mobile communication device is communicatively coupled to the home DLNA network via wireless local area network.

5. A method of communicatively coupling a mobile communication device to a home digital living network alliance (DLNA) network via an IP multimedia subsystem (IMS), comprising:

during initial configuration with a home DLNA network, discovering, by a mobile communication device, at least one client application of one or more client applications in at least one host device of a plurality of host devices in the home DLNA network, wherein the home DLNA network comprises:

a firewall that limits inbound traffic to the plurality of host devices in the home DLNA network from devices outside the home DLNA network, a router that implements dynamic internet protocol address assignment and network address translation for the plurality of host devices in the home DLNA network, which hinders devices outside the home DLNA network from being able to initiate a communication session with the plurality of host devices inside the home DLNA network, and the plurality of host devices executing the one or more client applications;

responsive to discovering the at least one client application during the initial configuration with the home DLNA network, configuring, by the mobile communication device, the at least one client application with an internet protocol routable address of an IMS server recognizable by the router, wherein the IMS server is remote from the home DLNA network; and when the mobile communication device is physically remote from home DLNA network after the configuration of the at least one client application, communicatively coupling, by the at least one client application executing on the at least one host device of the home DLNA network, to the IMS server;

forwarding, by the communicatively coupled at least one client application, at least one of available service information or content from the home DLNA network to the IMS server;

periodically polling, by the at least one client application, the IMS server for at least one of content or available service information destined for the home DLNA network from the mobile communication device;

responsive to the periodic polling, initiating, by the at least one client application, from within the home DLNA network, a communication session between the home DLNA network and the mobile communication device through the IMS server; and receiving, by the at least one client application from the IMS server, the at least one of available service information or content destined for the home DLNA network from the mobile communication device.

6. The method of claim 5, wherein the at least one client application can support more than one mobile communication device.

7. The method of claim 5, wherein the at least one host device with the at least one client application is operated by an Android operating system.

8. The method of claim 5, wherein the at least one host device with the at least one client application is a piece of customized hardware.

9. A method of communicatively coupling a mobile communication device to a home digital network, comprising:

during initial configuration with a home digital network, discovering, by a mobile communication device, a plurality of client applications in a plurality of host devices of the home digital network, wherein the home digital network comprises:

a firewall that limits inbound traffic to the plurality of host devices in the home digital network from devices outside the home digital network, a router that implements dynamic internet protocol address assignment and network address translation for the plurality of host devices in the home digital network, which hinders devices outside the home digital network from being able to initiate a communication session with the plurality of host devices inside the home digital network, and the plurality of host devices executing the plurality of client applications;

responsive to discovering the plurality of client applications during the initial configuration with the home digital network, configuring, by the mobile communication device, a client application of the plurality of discovered client applications with an internet protocol routable address of a server recognizable by the router, wherein the server is remote from the home digital network, and wherein each client application of the plurality of discovered client applications is associated with a priority state and the client application configured by the mobile communication device has the highest priority among the plurality of discovered client applications in the home digital network; and when the mobile communication device is physically remote from home digital network after the configuration of the client application, communicatively coupling, by the client application executing on a host device of the plurality of host devices in the home digital network, to the server;

forwarding, by the communicatively coupled client application, at least one of available service information or content from the home digital network to the server;

periodically polling, by the client application, the server for at least one of content or available service information destined for the home digital network from the mobile communication device;

responsive to the periodic polling, initiating, by the client application, from within the home digital network, a communication session between the home digital network and the mobile communication device through the server; and receiving, by the client application from the server, the at least one of available service information or content destined for the home digital network from the mobile communication device.

10. The method of claim 9, wherein the client application periodically examines whether or not the client application holds the highest priority among the plurality of client applications of the plurality of host devices in the home digital network.

11. The method of claim 9, wherein the client application periodically polls the server to obtain updated available service information from the mobile communication device and to examine whether or not the mobile communication device is communicatively coupled to the server.

12. The method of claim 9, wherein the available service information from the home digital network is information about services of the plurality of host devices in the home digital network.

13. The method of claim 9, wherein the available service information from the mobile communication device is information about services of the mobile communication device.

* * * * *